United States Patent
Rafie et al.

[11] Patent Number: 6,060,662
[45] Date of Patent: May 9, 2000

[54] FIBER OPTIC WELL LOGGING CABLE

[75] Inventors: Saeed Rafie, Houston; Josephine Lopez, McAllen, both of Tex.

[73] Assignee: Western Atlas International, Inc., Houston, Tex.

[21] Appl. No.: 09/012,334

[22] Filed: Jan. 23, 1998

[51] Int. Cl.[7] ................................................... H01B 7/18
[52] U.S. Cl. ................................. 174/106 R; 174/128.2
[58] Field of Search ........................... 174/106 R, 70 R, 174/116, 25 G, 15.5, 128.1, 128.2; 385/101, 102, 104, 107

[56] References Cited

U.S. PATENT DOCUMENTS

| | | | |
|---|---|---|---|
| 1,999,273 | 4/1935 | Austin | 174/128.1 |
| 2,222,932 | 11/1940 | Bennett | 174/106 R X |
| 3,996,413 | 12/1976 | Foord et al. | 174/116 X |
| 4,371,234 | 2/1983 | Parfree et al. | 350/96.23 |
| 4,372,043 | 2/1983 | Cookson | 174/106 R |
| 4,676,590 | 6/1987 | Priaroggia | 174/70 R X |
| 5,125,061 | 6/1992 | Marlier et al. | 174/70 R X |
| 5,125,062 | 6/1992 | Marlier et al. | 174/70 R X |
| 5,181,268 | 1/1993 | Chien | 385/128 |
| 5,230,033 | 7/1993 | Soodak | 385/105 |
| 5,349,137 | 9/1994 | Cedrone | 174/76 |
| 5,358,358 | 10/1994 | Tassone et al. | 138/111 X |
| 5,463,711 | 10/1995 | Chu | 174/70 R X |
| 5,574,815 | 11/1996 | Kneeland | 385/101 |
| 5,644,105 | 7/1997 | Castellani | 174/110 SR |
| 5,777,271 | 7/1998 | Carlson et al. | 174/107 |

Primary Examiner—Dean A. Reichard
Attorney, Agent, or Firm—Richard A. Fagin; Madan, Mossman & Sriram

[57] ABSTRACT

A well logging cable including an optical fiber and a pressure sealed enclosure surrounding the fiber. The enclosure is adapted to be able to be elongated to the maximum expected axial strain on the logging cable without permanent deformation. In one embodiment, the enclosure is a corrugated-wall tube surrounding the optical fiber. The tube contains toroidally shaped rings within the maximum diameter portions of the corrugations in the tube wall. The cable includes armor wires wound around the corrugated-wall tube. In the preferred embodiment, the tube is surrounded by an elastomeric jacket, and is filled with hydraulic oil or the like to prevent entry of wellbore fluids into the tube under hydrostatic pressure.

11 Claims, 3 Drawing Sheets

FIBER OPTIC WELL LOGGING CABLE

BACKGROUND OF THE INVENTION

1. Field of the Invention

The invention is related to the field of armored electrical cables used for well logging. More specifically, the invention is related to designs for a well logging cable including an optical fiber for signal communication.

2. Description of the Related Art

U.S. Pat. No. 5,495,547 issued to Rafie et al and assigned to the assignee of this invention describes limitations in the signal carrying capacity of electrical well logging cables which have only electrical conductors. The Rafie et al '547 patent discloses a well logging cable having optical fibers which can substitute for one or more of the electrical conductors in a well logging cable to increase the signal carrying capacity.

As is understood by those skilled in the art, well logging cables typically include one or more electrical conductors and armor wires which are wound around the conductors in a pattern designed to maintain a substantially round cross-sectional shape of the cable under repeated applications and relaxations of high axial tension to the cable, while also subjecting the cable to significant bending stresses. Repeated application and relaxation of axial tension and bending stresses occurs mainly as a result of lowering well logging instruments into a wellbore and later removing them from the wellbore by spooling the logging cable through various sheaves which direct the cable into the wellbore. The well logging cables known in the art having only electrical conductors provide good maintenance of the round cross-section of the cable because all of the conductors have similar tensile and bending properties.

Direct substitution of electrical conductors with optical fibers to provide a logging cable having optical fibers can result in the cable having asymmetrical tensile and bending properties, and possibly reduced resistance to deformation of the circular cross-section of the cable. This can be the case even where the optical fibers are enclosed in a steel tube, as disclosed in the Rafie et al '547 patent. Furthermore, some types of well logging cables have only one electrical conductor. The electrical conductor in one-conductor well logging cables is generally straight and has helically wound armor wires surrounding it. The single conductor is straight just as is the center conductor in a multi-conductor well logging cable. The optical fiber/steel tube combination disclosed in the Rafie et al '547 patent is generally not applicable to single conductor logging cables or to being used in the center position in multi-conductor logging cables because of the large axial strain which normally occurs on a "straight" conductor when tension is applied to the cable. For example, a combination fiber-optic/electrical well logging cable having the optical fiber enclosed in a steel tube is disclosed in U.S. Pat. No. 4,522,464 issued to Thompson et al, wherein the optical fiber enclosed in the steel tube is disposed in the center conductor position of a multiple-conductor well logging cable. A drawback to the cable disclosed in the Thompson et al '464 patent is that the steel tube used to enclose the optical fiber is subject to inelastic strain and eventual failure as a result of repeated applications and relaxations of axial tension to the cable. The tube, which is positioned in the center of the cable as disclosed in the Thompson et al '464 patent, is subject to greater axial elongation under tension than the armor wires since the armor wires are helically wound around the axis of the cable whereby elongation of the cable under tension is at least partially dissipated by unwinding of the helical lay of the armor wires as contrasted to the tube which elongates to the same degree as the change in length of the cable under tension.

Excessive axial strain on the tube may also affect another combination fiber optic/electrical well logging cable disclosed in international patent application number WO 94/28450 published under the Patent Cooperation Treaty. The cable disclosed in the WO 94/28450 application also includes an optical fiber enclosed in a metal tube positioned at the center of the cable.

At least one reference suggests using plastic instead of steel for a tube to enclose the optical fiber in a well logging cable. Plastic can have greater strain capacity to a center-located, or a single optical fiber than steel. A plastic tube, without more, is insufficient to provide optical fiber capability to well a logging cable. Another type of combination fiber/optic electrical well logging cable described in "Manufacturing and testing of armored fiber optic downhole logging cable" by Randall et al, Wire Journal, September 1980 provides a plastic-sheathed optical fiber to replace one or more of the electrical conductors in a conventional logging cable. The cable in the Randall et al article has proven commercially unacceptable for well logging because the optical fiber is subject to fluid pressure in the wellbore, since the plastic sheath around the fiber is not pressure sealed. The plastic tubing may be filled with oil in order to exclude wellbore fluids from entering the tube under hydrostatic pressure, but plastic tubes may not provide enough resistance to crushing under high bending stress or high lateral force applied to the cable.

SUMMARY OF THE INVENTION

The invention is a well logging cable including an optical fiber and a pressure sealed enclosure surrounding the fiber. The enclosure is adapted to be able to be elongated to the maximum expected axial strain on the logging cable without permanent deformation. In a preferred embodiment, the enclosure consists of a corrugated-wall steel tube. The steel tube contains toroidally shaped steel support rings within the maximum diameter portions of the corrugations in the tube wall to prevent crushing the tube under lateral "crushing" stress. The cable includes armor wires wound around the corrugated-wall tube. In the preferred embodiment of the invention, the corrugated wall tube is surrounded by an elastomeric jacket, and the tube is filled with hydraulic oil or the like to prevent entry of wellbore fluids into the tube under hydrostatic pressure.

The corrugations in the wall of the tube provide the wall of the tube with enough length relative to the expected axial strain of the logging cable so that the tube remains within its elastic limit at the maximum expected axial strain on the cable.

In another embodiment of the invention, the enclosure is a helically wound steel wire. The steel wire provides crush resistance to the optical fiber. The spacing at zero axial stress between the coils of the helically wound steel wire is the minimum to prevent coil bind at the minimum bending radius of curvature of the cable. The helically wound steel wire can be surrounded by an elastomeric jacket. The jacket can be filled with hydraulic oil or the like to prevent entry of wellbore fluids under hydrostatic pressure.

DESCRIPTION OF THE PREFERRED EMBODIMENT

Figure 1:
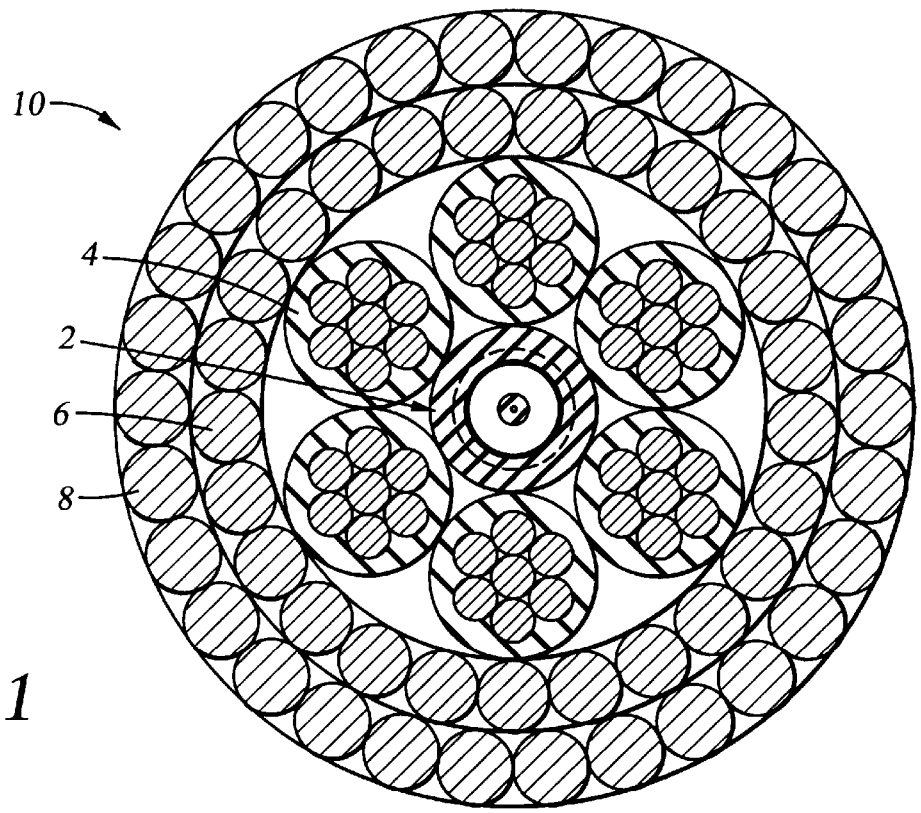
FIG. 1 shows a well logging cable including an optical fiber enclosed according to the invention located in a center conductor position in the cable.

An end view of a well logging cable according to the invention is shown in FIG. 1 at 10. The cable 10 can include a plurality of electrical conductors 4 arranged in a regular pattern. The electrical conductors 4 are surrounded by a layer of helically wound inner armor wires 6. The inner armor wires 6 are themselves surrounded by a layer of helically wound outer armor wires 8. This part of the construction of the well logging cable 10 is known in the art. An enclosed optical fiber 2 is shown in the position normally occupied by a central one of the electrical conductors 4. As is known in the art, the electrical conductor located in the center of the cable is subject to substantially the same degree of axial strain (elongation) as the overall change in length of the cable 10 when axial tension is applied to the logging cable 10. Lateral "crushing" forces are applied to the cable 10 as it bends around various sheave wheels (not shown) used for spooling the cable into a wellbore (not shown). These lateral forces can be partially absorbed by deformation of a plastic jacket surrounding each of the electrical conductors 4.

It should be understood that the cable 10 of the invention does not require the same number of electrical conductors 4 as shown in FIG. 1. The cable 10 may be made without any electrical conductors for particular purposes if desired. The cable 2 may in this case include only the enclosed optical fiber 2 surrounded by inner 6 and outer 8 armor wires. The enclosed optical fiber 2 may optionally include a provision to improve its electrical conductivity to be able to carry electrical power and/or electrical signals, which will be further explained.

Figure 2:
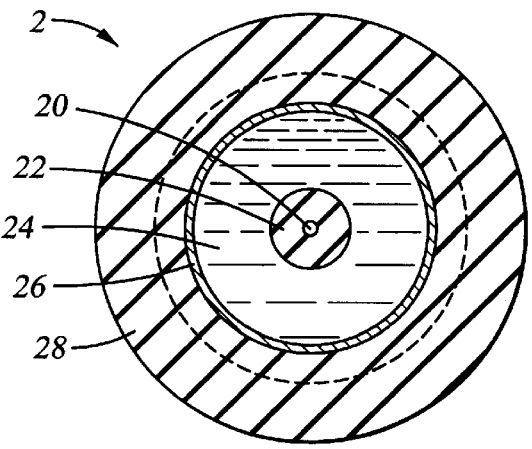
FIG. 2 shows a detailed end view of the enclosed optical fiber of the invention.

An end view of the enclosed optical fiber 2 is shown in FIG. 2. The enclosed optical fiber 2 can include one or more optical fibers 20 of types well known in the art. See for example, U.S. Pat. No. 5,495,547 issued to Rafie et al or U.S. Pat. No. 4,522,464 issued to Thompson et al. The optical fiber 20 may be optionally directly surrounded by an elastomeric jacket 22 to provide resistance to abrasion of the fiber 20 against the wall of a corrugated-wall steel tube 26 in which the fiber 20 can be contained. The fiber 20 and jacket 22 can be disposed inside the steel tube 26, which can have its wall formed into a "wave" or "bellows"-like shape, which will be further explained. The tube 26 can have a minimum internal diameter sufficiently greater than the outside diameter of the jacket 22 to enable free movement of the jacket 22 inside the tube 26. The annular space between the tube 26 and the jacket 22 can be filled with a chemically and thermally inert liquid 24 such as hydraulic oil or the like to prevent entry under hydrostatic pressure of fluids (not shown) inside the wellbore (not shown) into which the cable (10 in FIG. 1) is inserted for well logging operations. The tube 26 may be covered with an elastomeric outer jacket 28 having an outside diameter similar to that of a typical electrical conductor used in well logging cables (generally on the order of 0.08 to 0.09 inches). The outer jacket 28 can absorb a small amount of lateral crushing and enables a small amount of lateral movement of the tube 26 within the outer jacket 28 under lateral strain to reduce the possibility of crushing the tube 26.

Figure 3:
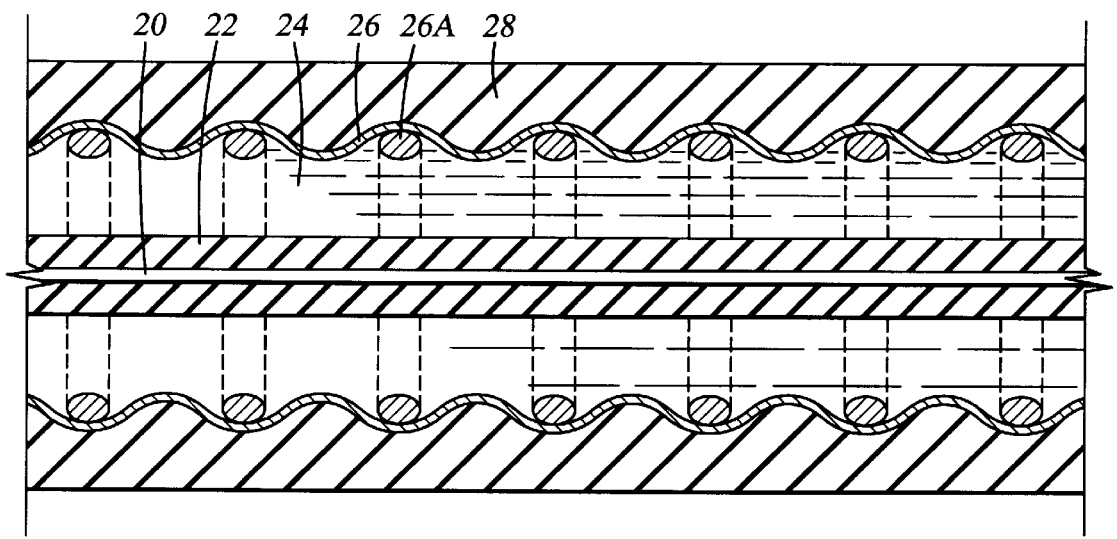
FIGS. 3 and 4 show a cross-sectional view of the enclosed optical fiber of the invention.
Figure 4:
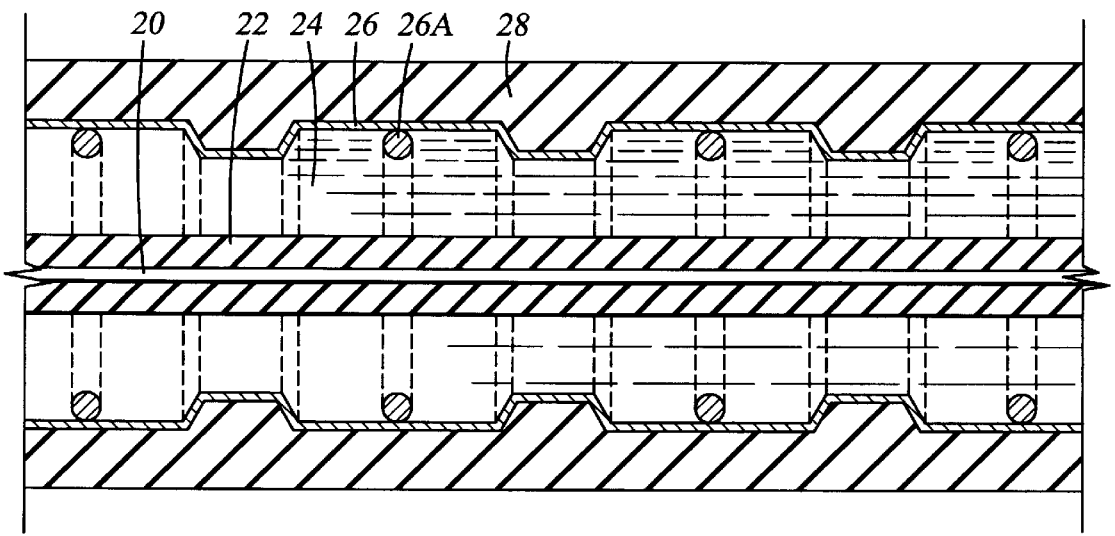

One possible shape for the corrugated-wall tube 26 is shown in a cross-section of the enclosed fiber 2 in FIG. 3. The wall of the tube 26 can be formed into "wave"-like shapes having interior curvatures suitable for inclusion of solid, toroidally-shaped "rings" 26A into the interior curves of the "waves" in the wall of the tube 26. The rings 26A provide a high degree of resistance to crushing the tube 26 under large lateral stress such as can occur when bending the logging cable (10 in FIG. 1) over sheave wheels or the like. The "wave" shape for the corrugated-wall tube 26 shown in FIG. 3 is not the only suitable shape for the tube 26. FIG. 4 shows an alternative shape for the tube 26 wherein the tube wall is formed into a "bellows"-like shape. The tube 26 shown in FIG. 4 can include the rings 26A as for the tube in FIG. 3 to provide crush resistance under lateral strain.

The purpose of the corrugation of the wall of the tube into the "wave" shape shown in FIG. 3 or into the "bellows" shape shown in FIG. 4, is to provide the tube 26 with a wall length which is greater than the overall length of the enclosed fiber 2. The enclosed fiber 2, as previously explained, will be stretched to substantially the same degree as the overall change in length of the logging cable (10 in FIG. 1) under axial tension. The axial strain on the logging cable can be as much as 1 percent under the maximum permissible axial tension on the cable, as is known in the art. The actual length of the wall of the tube 26 provided by the "wave" shape shown in FIG. 3 or the "bellows" shape shown in FIG. 4 is preferably enough so that the tube 26 will remain well within its elastic limit at the maximum expected axial strain on the cable under tension to avoid deforming the tube 26. The rings 26A should have sufficient thickness to avoid being crushed under the maximum expected lateral (bending and crushing) forces to be applied to the logging cable (10 in FIG. 1) during use.

A preferred material for the tube 26 is stainless steel. See for example U.S. Pat. No. 5,495,547 issued to Rafie et al. Stainless steel is preferred because of its strength and resistance to corrosion, but is not the only material which is suitable for the tube 26. Considerations in selecting appropriate material for the tube 26 include flexibility, tensile strength, shear strength, resistance to corrosion, and ability to withstand the maximum expected temperature to which the logging cable is to be exposed.

DESCRIPTION OF ALTERNATIVE EMBODIMENTS

Figure 5:
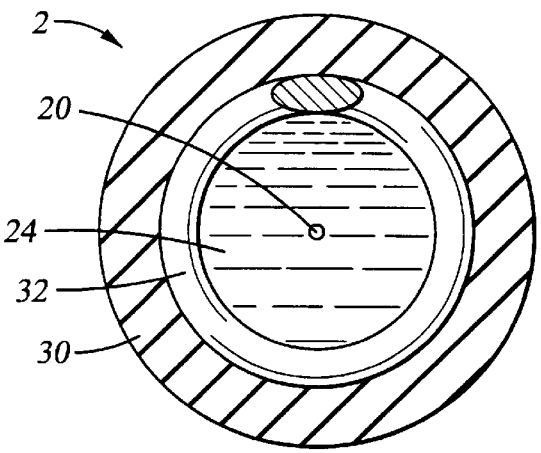
FIG. 5 shows a detailed end view of an alternative embodiment of the enclosed fiber of the invention.
Figure 6:
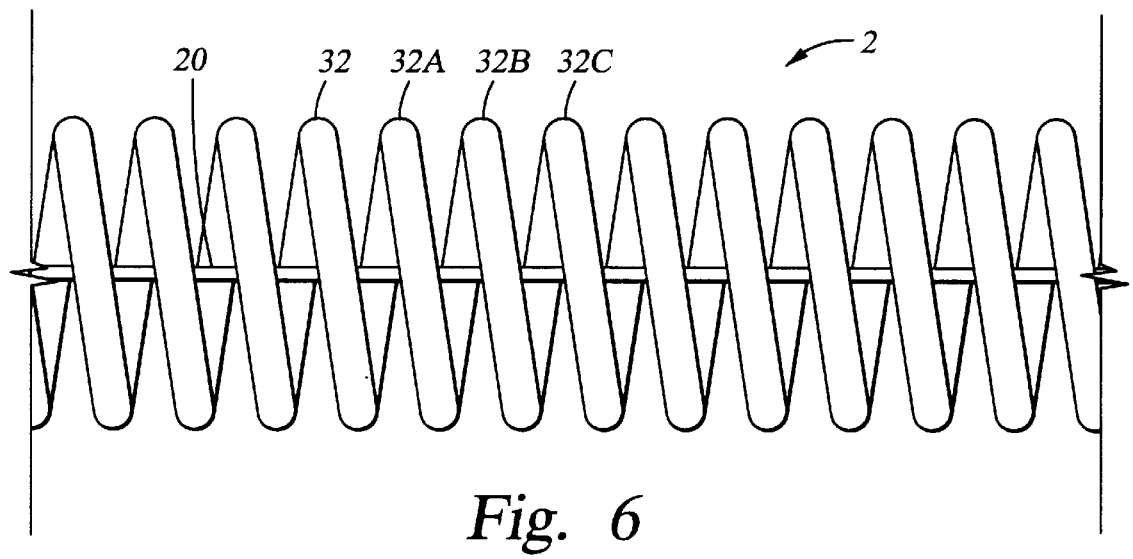
FIGS. 6 and 7 show a cross-sectional view of the alternative embodiment of the enclosed optical fiber of the invention.

FIG. 5 shows an alternative embodiment of the enclosed optical fiber 2. The optical fiber 20 may be surrounded by a helically wound steel wire 32. The steel wire 32 should have a wire diameter large enough so that the wound wire 32 has sufficient crush resistance to withstand the maximum lateral force expected to be applied to the logging cable. The helically wound wire 32 can be covered on its exterior by an elastomeric jacket 30. The annular space between the jacket 30 and the optical fiber 20 is preferably filled a liquid 24 such as hydraulic oil or the like to prevent entry of fluids from the wellbore under hydrostatic pressure. A cross-section of the alternative embodiment of the enclosed optical fiber 2 is shown in FIG. 6 without the outer jacket (30 in FIG. 5), and in FIG. 7 with the outer jacket 30. In FIG. 6, the wire 32 is preferably wound so that the spacing between the individual coils 32A, 32B, 32C under zero axial tension is no more than is needed to compensate for bending the cable (10 in FIG. 1) to its minimum allowable radius of curvature. The spacing can generally be defined as that which prevents "coil bind", where the individual coils 32A, 32B, 32C come into contact with each other as the cable is bent. Although shown in FIG. 6 as passing substantially straight through the wound wire 32, the optical fiber 20 preferably includes enough slack to prevent its being axially stretched when the logging cable (10 in FIG. 1) is subjected to its maximum expected axial strain.

Figure 7:
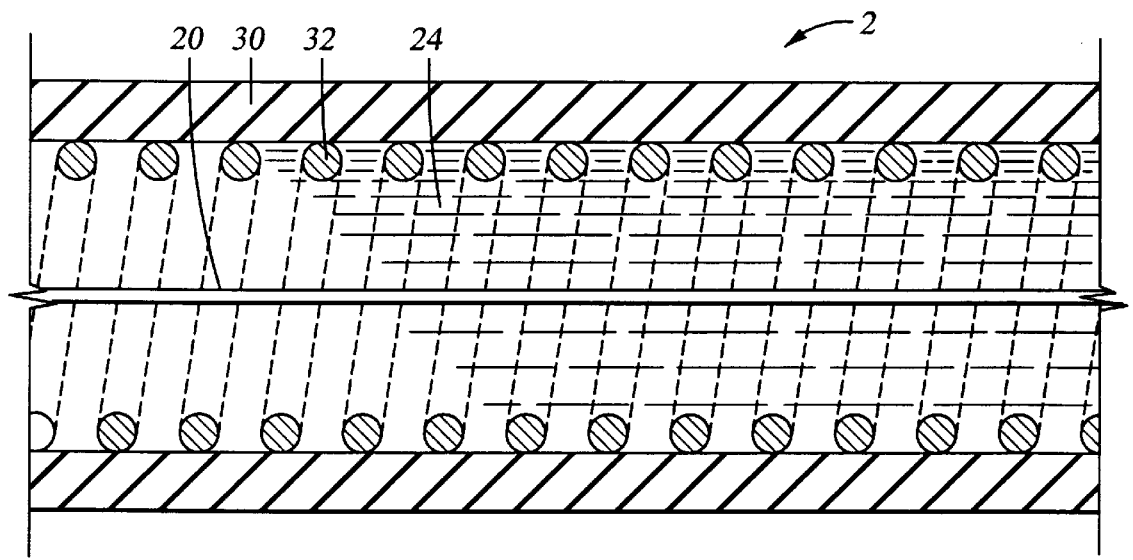

The alternative embodiment of the enclosed fiber 2 is shown in FIG. 7 with its outer jacket 30 applied to the exterior of the wound steel wire 32. As previously explained, the jacket 30 provides containment for a fluid 24 filling the annular space between the wire 32 and the fiber 20 so that fluids in the wellbore will not enter the enclosed fiber 2 under hydrostatic pressure.

Figure 8:
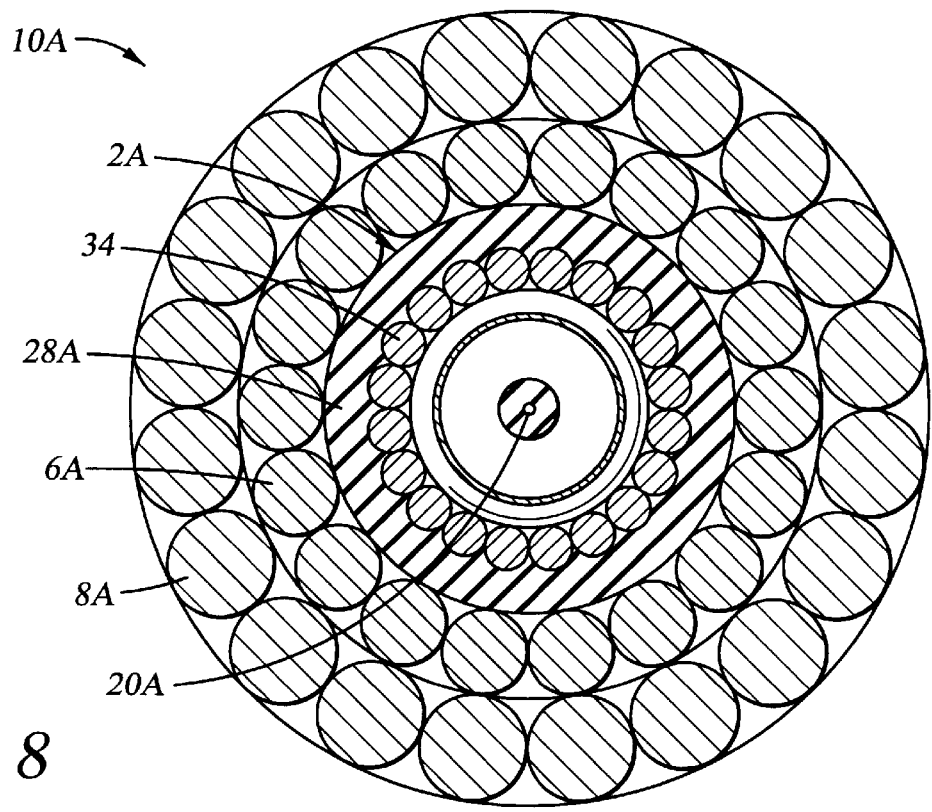
FIG. 8 shows an alternative construction for the enclosed optical fiber which has electrical conductive capacity.

An alternative construction for the enclosed optical fiber which includes electrical conductive capacity is shown at 2A in FIG. 8. The optical fiber 20A can be surrounded by a wave- or bellows-shaped corrugated tube 26A, similar to those shown in FIGS. 3 and 4. The corrugated tube 26A can be surrounded by a number of conductive strands 34 such as made from copper or the like for providing electrical conductivity to the enclosed fiber 2A. The size and number of the strands 34 will depend on the maximum external diameter of the tube 26A and the amount of conductance desired. See for example U.S. Pat. No. 5,495,547 issued to Rafie et al. The tube 26A may also be copper plated or clad on its exterior surface to improve the electrical conductivity of the overall structure. The copper strands 34 can be surrounded by an elastomeric outer jacket 28A. The jacket 28A in this embodiment of the enclosed fiber 2A should be substantially electrically non-conductive since the enclosed fiber is meant to carry electrical power and/or electrical signals along its length.

Both the first embodiment of this invention and the present embodiment are intended to provide a pressure-sealed, abrasion and crush resistant enclosure for an optical fiber in a well logging cable. The enclosure for the optical fiber can be elongated to the same amount as the maximum expected axial strain on the logging cable without permanent deformation of the enclosure. The enclosure for the optical fiber can also resist being crushed when the maximum expected lateral crushing force is applied to the well logging cable.

Those skilled in the art will devise other embodiments of this invention which do not depart from the spirit of the invention as described herein. The invention should therefore be limited in scope only by the attached claims.

What is claimed is:

1. A cable comprising:
   an optical fiber;
   a corrugated-wall tube having a plurality of maximum diameter portions surrounding said optical fiber, each said maximum diameter portion containing a substantially toroidally shaped ring, said tube being pressure sealed to exclude fluids from a wellbore from entering said tube under hydrostatic pressure, said tube having an elastic limit at least equal to a predetermined axial strain value on said cable, said tube adapted to withstand crushing in normal use when a lateral force is applied to said cable; and
   armor wires wound around said tube.

2. The well logging cable as defined in claim 1 further comprising an inner elastomeric jacket disposed outside said optical fiber and inside said tube to provide abrasion resistance to said optical fiber.

3. The well logging cable as defined in claim 1 further comprising a chemically and thermally inert liquid filling an annular space between said fiber and said tube to prevent entry under hydrostatic pressure of fluids into said tube.

4. The well logging cable as defined in claim 1 further comprising an outer elastomeric jacket disposed on an external surface of said tube.

5. The well logging cable as defined in claim 4 further comprising conductive strands surrounding said tube and inside said outerjacket, said outer jacket surrounding said conductive strands, said outer jacket comprising a substantially electrically nonconductive material.

6. The well logging cable as defined in claim 1 further comprising a plurality of insulated electrical conductors wound helically in a substantially symmetric pattern within said armor wires and around said tube, said tube disposed in a central position within said pattern.

7. A cable comprising:
   an optical fiber;
   a wire helically wound around said optical fiber, said wire resistant to crushing thereof under a lateral force on said cable and having an elastic limit at least as large as a predetermined axial strain value;
   an outer elastomeric jacket disposed on an exterior surface of said wire, said jacket being pressure sealed to exclude fluids from a wellbore from entering said jacket under hydrostatic pressure; and
   armor wires wound around said jacket.

8. The well logging cable as defined in claim 7 further comprising an inner elastomeric jacket disposed outside said optical fiber and inside said wire to provide abrasion resistance to said optical fiber.

9. The well logging cable as defined in claim 7 further comprising a chemically and thermally inert liquid filling an annular space between said fiber and said outer elastomeric jacket to prevent entry of fluids from outside said outerjacket under hydrostatic pressure.

10. The well logging cable of claim 7 further comprising conductive strands surrounding said wire, said outer jacket surrounding said conductive strands, said outer jacket comprising a substantially nonconductive material.

11. The well logging cable of claim 7 further comprising a plurality of electrical conductors helically wound in a substantially symmetric pattern within said armor wires.

* * * * *